US010289165B2

(12) United States Patent
Miyamoto et al.

(10) Patent No.: US 10,289,165 B2
(45) Date of Patent: May 14, 2019

(54) ELECTRONIC DEVICE

(71) Applicant: LENOVO (SINGAPORE) PTE. LTD., Singapore (SG)

(72) Inventors: Tabito Miyamoto, Kanagawa (JP); Masayuki Amano, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 16/054,470

(22) Filed: Aug. 3, 2018

(65) Prior Publication Data

US 2019/0041916 A1 Feb. 7, 2019

(30) Foreign Application Priority Data

Aug. 7, 2017 (JP) ................................ 2017-152360

(51) Int. Cl.
*G06F 1/16* (2006.01)

(52) U.S. Cl.
CPC .......... *G06F 1/1654* (2013.01); *G06F 1/1601* (2013.01); *G06F 1/1616* (2013.01); *G06F 1/1626* (2013.01); *G06F 1/1679* (2013.01); *G06F 2200/163* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,927,972 | B1 * | 8/2005 | Wang | G06F 1/1616 361/679.55 |
| 6,937,468 | B2 * | 8/2005 | Lin | G06F 1/1632 361/679.41 |
| 8,867,203 | B2 * | 10/2014 | Katsuta | E05B 73/0082 361/679.01 |
| 9,025,321 | B2 * | 5/2015 | Liang | G06F 1/1669 361/679.01 |
| 9,141,146 | B2 * | 9/2015 | Ke | G06F 1/1632 |
| 9,223,356 | B2 * | 12/2015 | Chuang | G06F 1/1626 |
| 9,229,484 | B2 * | 1/2016 | Chen | G06F 1/166 |
| 9,268,369 | B2 * | 2/2016 | Hirai | G06F 1/1669 |
| 9,280,178 | B2 * | 3/2016 | Chen | G06F 1/1613 |
| 9,310,848 | B2 * | 4/2016 | Fujino | G06F 1/1654 |
| 9,329,640 | B2 * | 5/2016 | Chang | G06F 1/1679 |

(Continued)

FOREIGN PATENT DOCUMENTS

JP 2005158013 A 6/2016

*Primary Examiner* — Lisa Lea-Edmonds
(74) *Attorney, Agent, or Firm* — Antony P. Ng; Russell Ng PLLC

(57) ABSTRACT

An electronic device having two chassis stably attached to each other is provided. The electronic device includes a first chassis having a display and a second chassis detachable from the first chassis. The second chassis includes a support post that protrudes from the attachment surface to which the first chassis is attached and has a claw portion on a tip side. The first chassis includes a post hole into which the support post is inserted and an engaging projection that engages with the claw portion of the support post inserted into the post hole and elastically biased so that the claw portion can be pressed towards the insertion direction to the post hole. The first chassis has an engaging slider having the engaging projection where the engaging projection is elastically biased in a direction of engaging with the claw portion.

12 Claims, 15 Drawing Sheets

(56) References Cited

U.S. PATENT DOCUMENTS

| | | | | |
|---|---|---|---|---|
| 9,335,792 | B2 * | 5/2016 | Matsumoto | G06F 1/1632 |
| 9,459,657 | B2 * | 10/2016 | Kim | G06F 1/1632 |
| 9,575,513 | B2 * | 2/2017 | Nishioka | G06F 1/1669 |
| 9,594,398 | B2 * | 3/2017 | Liang | G06F 1/1669 |
| 9,651,993 | B2 * | 5/2017 | Huang | G06F 1/1632 |
| 9,673,566 | B2 * | 6/2017 | Chen | H01R 13/4538 |
| 9,690,332 | B2 * | 6/2017 | Liu | G06F 1/1681 |
| 9,898,043 | B2 * | 2/2018 | Agata | G06F 1/1632 |
| 9,971,387 | B2 * | 5/2018 | Kamimura | G06F 1/20 |
| 2013/0259564 | A1 * | 10/2013 | Lin | H01R 13/42 403/327 |
| 2014/0133080 | A1 * | 5/2014 | Hwang | G06F 1/1632 361/679.17 |
| 2018/0109030 | A1 * | 4/2018 | Nakatani | G06F 1/16 |
| 2018/0181166 | A1 * | 6/2018 | Katsuyama | G06F 1/1616 |
| 2018/0184535 | A1 * | 6/2018 | Katsuyama | G06F 1/1616 |

* cited by examiner

ELECTRONIC DEVICE

PRIORITY CLAIM

The present application claims benefit of priority under 35 U.S.C. §§ 120, 365 to the previously filed Japanese Patent Application No. JP2017-152360 with a priority date of Aug. 7, 2017, which is incorporated by reference herein.

TECHNICAL FIELD

The present invention relates to electronic devices in general, and in particular to an electronic device having a first chassis and a detachable second chassis.

BACKGROUND

In recent years, tablet personal computers (tablet PCs) having a touch-panel liquid crystal display but not a physical keyboard are very popular. A tablet PC is easy to carry and easy to operate since any input work can to performed via a touch panel.

The tablet PC, however, sometimes has a trouble in an input work of a long sentence or the like because of not having a physical keyboard. Therefore, a computer having a tablet PC as a first chassis that is detachable from a keyboard as a second chassis comes into play. This type of computer can be used as a laptop PC or a tablet PC, thereby providing a user with even more convenience.

With above-mentioned computer, the tablet PC is fitted into a housing groove of a rotary frame in a dock seat provided with a keyboard. However, this type of attachment may cause wobbling due to a gap that occurs between the tablet PC and the housing groove. To prevent wobbling, the housing groove needs to be deeper. But a deeper housing groove leads to an increase in size of the dock seat correspondingly. Particularly, a tablet PC tends to be heavier than the display of a laptop PC and therefore it is difficult to attach the tablet PC stably to the dock seat. Furthermore, in this type of attachment form, the tablet PC is not locked with the dock seat and therefore it leads to a concern that the tablet PC unexpectedly comes out of the dock seat if some external force is applied to the table PC.

On the other hand, a tablet PC preferably has a compact and lightweight docking system so that its portability is not impaired, and particularly a part where the docking system is housed preferably has a thin width.

Moreover, the tablet PC is supposed to be used in various ways. Often having a baggage in addition to the tablet PC when using the tablet PC outside, the user cannot always use both hands freely. Accordingly, when detaching the table PC as the upper chassis from the lower chassis, it is preferable for a user to be able to handle the tablet PC with one hand.

Consequently, it would be desirable to provide an improved computer having a tablet PC as a first chassis and a keyboard as a second chassis.

SUMMARY

In accordance with an embodiment of the present disclosure, an electronic device includes a first chassis having a display and a second chassis detachable from the first chassis. The second chassis includes a support post that protrudes from the attachment surface to which the first chassis is attached and has a claw portion on a tip side. The first chassis includes a post hole into which the support post is inserted and an engaging projection that engages with the claw portion of the support post being inserted into the post hole and elastically biased so that the claw portion can be pressed towards the insertion direction to the post hole. The first chassis also has an engaging slider having the engaging projection where the engaging projection is elastically biased in a direction of engaging with the claw portion.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
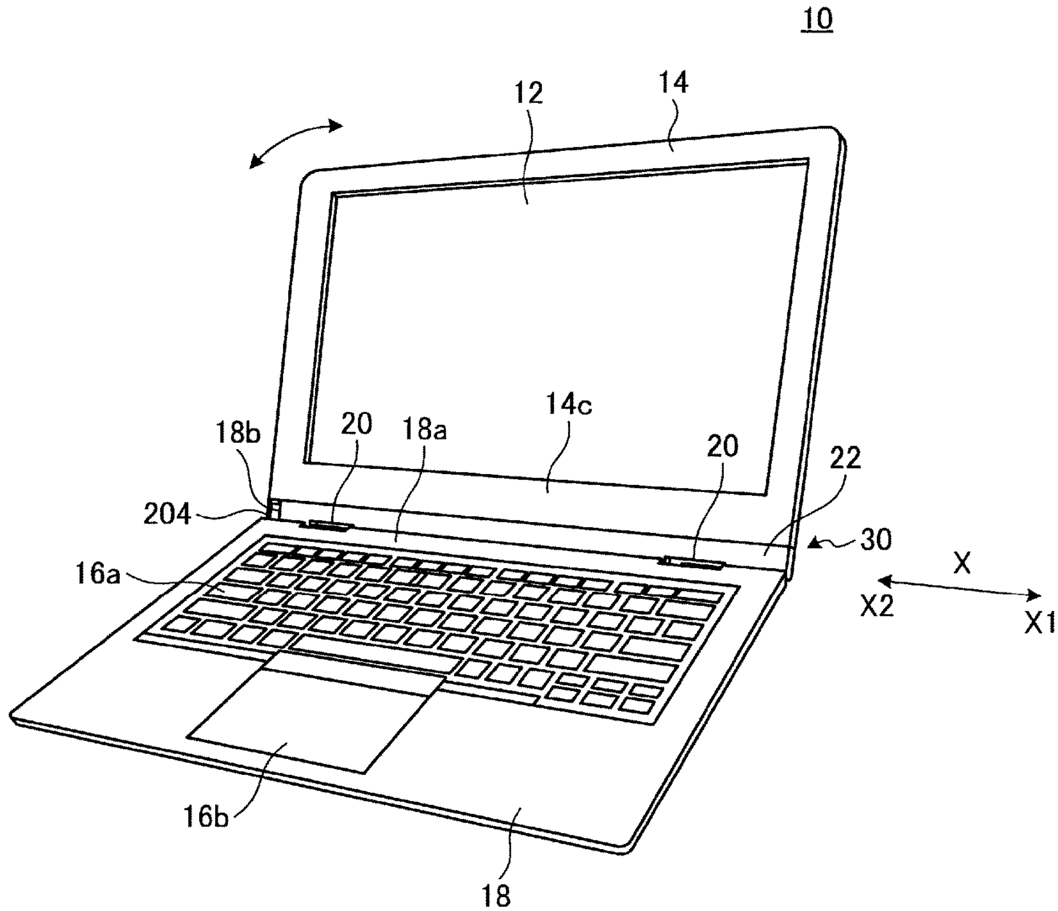
FIG. 1 is a perspective view of an electronic device according to one embodiment.
Figure 2:
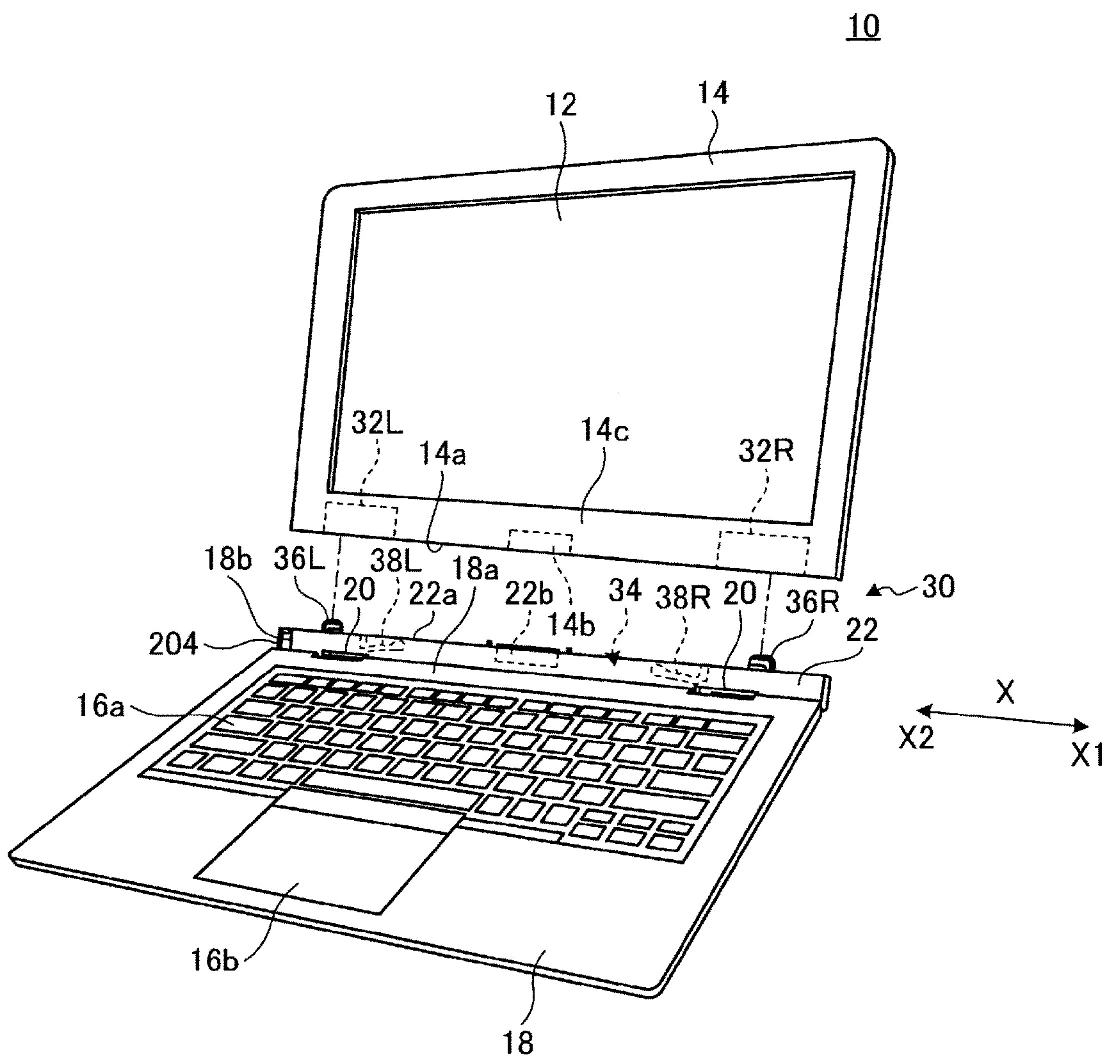
FIG. 2 is a perspective view of the electronic device from FIG. 1 in a state where an upper chassis and a lower chassis are separated from each other.

FIG. 1 is a perspective view of an electronic device 10 according to one embodiment, where an upper chassis (first chassis) 14 having a display 12 is attached to a lower chassis (second chassis) 18 provided with a keyboard **16*a* and a touch pad 16_b_. FIG. 2 is a perspective view illustrating the electronic device 10 illustrated in FIG. 1 in a state where the upper chassis 14 is detached from the lower chassis 18**.

The electronic device 10 is a hybrid PC used as a notebook (laptop) PC and as a tablet PC, such that the electronic device 10 functions as a laptop PC when the upper chassis 14 is attached to the lower chassis 18 and that the upper chassis 14 alone functions as a tablet PC when the upper chassis 14 is separated from the lower chassis 18. This embodiment is preferably applicable to any electronic device as long as it has two chassis that can be separated from each other such as a cell phone, a smartphone, an electronic organizer, or the like, in addition to this type of hybrid PC. Hereinafter, the vertical direction, the horizontal direction, the depth direction, the front, and the rear are defined as those when viewed from a user who visually recognizes the display 12 and the bracket 22 with the upper chassis 14 erected substantially orthogonal to the lower chassis 18, as illustrated in FIG. 1. Moreover, the horizontal direction, the right direction in the front view, and the left direction in the front view are defined as the X direction, the X1 direction, and the X2 direction, respectively. The vertical direction is an attachment/detachment direction of the upper chassis 14 and the lower chassis 18. Furthermore, the expressions "clockwise direction" and "counterclockwise direction" with respect to the rotating motion are based on a drawing referenced at each time. Moreover, regarding symmetrical constituent elements, appropriately L is appended to a constituent element on the left side in the front view and R is appended to a constituent element on the right side in the front view.

As illustrated in FIGS. 1 and 2, the electronic device 10 includes the upper chassis 14 having the display 12 and the lower chassis 18 having the keyboard 16_a_ and the touch pad 16_b_. The upper chassis 14 is able to be attached to or detached from the bracket 22 that is rotatably coupled to the lower chassis 18 by a pair of right and left hinges 20 and 20. The upper chassis 14 attached to the bracket 22 serves as a lid capable of opening and closing the upper surface of the lower chassis 18 (the surface on the keyboard 16_a_ side) by being rotated by the hinges 20 and functions in the same manner as an openable display unit of a general laptop PC, by which the upper chassis 14 can be adjusted to an easy-to-see angle. In the end portion of the upper surface of the lower chassis 18, a space 18_a_ is secured so as to prevent the bracket 22 from overlapping the keyboard 16_a_ from a viewpoint on design when the bracket 22 is put down.

The upper chassis 14 is provided with the display 12, which includes, for example, a touch-panel liquid crystal display unit, and houses various electronic components (not illustrated) such as a substrate, an arithmetic unit, a memory, and the like constituting a tablet PC in the inside. Due to a function of a docking system 30 described later, the upper chassis 14 is attached or detached with an attachment surface 14_a_ to be a lower end face thereof in contact with or apart from an attachment surface 22_a_ to be an upper end face of the bracket 22. Furthermore, the upper chassis 14 is electrically connected to the lower chassis 18 by mating of the upper connector 14_b_ provided in the attachment surface 14_a_ with the lower connector 22_b_ provided in the attachment surface 22_a_ of the bracket 22. The upper chassis 14 may have the same structure as a general tablet PC, except that the upper chassis 14 has the detachable mechanism from the lower chassis 18, a control function, and the like. The upper chassis 14 is able to be used alone as a tablet PC and has a battery.

The lower chassis 18 is a device for expansion of the upper chassis 14, having the physical keyboard 16_a_ and the touch pad 16_b_, which function as external input units of the upper chassis 14, and causes the upper chassis 14, which is a tablet PC, as a laptop PC to improve the convenience of the upper chassis 14. The lower chassis 18, to which one end of the hinge 20 is fixed, rotatably supports the bracket 22 fixed to the other end of the hinge 20. Naturally, the lower chassis 18 may include an electronic component other than the keyboard 16_a_ and the touch pad 16_b_, such as, for example, a magnetic disk device, an optical disk device, or other expansion devices. The electric power for the lower chassis 18 may be supplied from the upper chassis 14. Alternatively, the lower chassis may include a battery or may use an AC power supply. The lower chassis 18 may serve as a charger for the upper chassis 14.

As understood from FIGS. 1 and 2, the bracket 22 and the space 18_a_ have narrow vertical widths and correspondingly wide spaces are provided for the keyboard 16_a_ and the touch pad 16_b_. The lower frame 14_c_ of the display 12 in the upper chassis 14 has a narrow vertical width and correspondingly a wide space is provided for the display 12. The bracket 22 and the upper chassis 14 each have a thin depth (thickness) and have the same thickness.

The following describes the docking system 30 for attaching or detaching the upper chassis 14 and the lower chassis 18 to or from each other.

As illustrated in FIG. 2, the docking system 30 has symmetrical engaging mechanisms 32R and 32L provided in the lower frame 14_c_ of the upper chassis 14 and a lower sub-system 34 provided in the bracket 22 of the lower chassis 18. The engaging mechanism 32L and the engaging mechanism 32R are provided sufficiently apart from each other in the horizontal direction in the lower frame 14_c_ as long as it is allowable on a design. The lower sub-system 34 includes symmetrical support posts (hook members) 36R and 36L, symmetrical release pushers 38R and 38L, and a drive unit 40 (see FIG. 7) for rotating the release pushers 38R and 38L. The support posts 36R and 36L are provided sufficiently apart from each other in the horizontal direction so as to correspond to the engaging mechanisms 32R and 32L, respectively, thereby enabling the upper chassis 14 to be supported stably.

The docking system 30 basically attaches or detaches the upper chassis 14 and the lower chassis 18 to or from each other by the engagement or separation of the engaging projections 60 of the engaging sliders 44 (see FIG. 5) of the engaging mechanisms 32R and 32L with or from the support posts 36R and 36L as hook members.

Hereinafter, the engaging mechanism 32R is described first and then the lower sub-system 34 is described. The engaging mechanism 32L, the support post 36L, and the release pusher 38L are bilaterally symmetrical with the engaging mechanism 32R, the support post 36R, and the release pusher 38R, and therefore the detailed description thereof is omitted. In the description of the engaging mechanism 32R, the support post 36R, and the release pusher 38R, "R" indicating the right side is omitted with respect to the reference numerals of the constituent elements to avoid complication.

Figure 3:
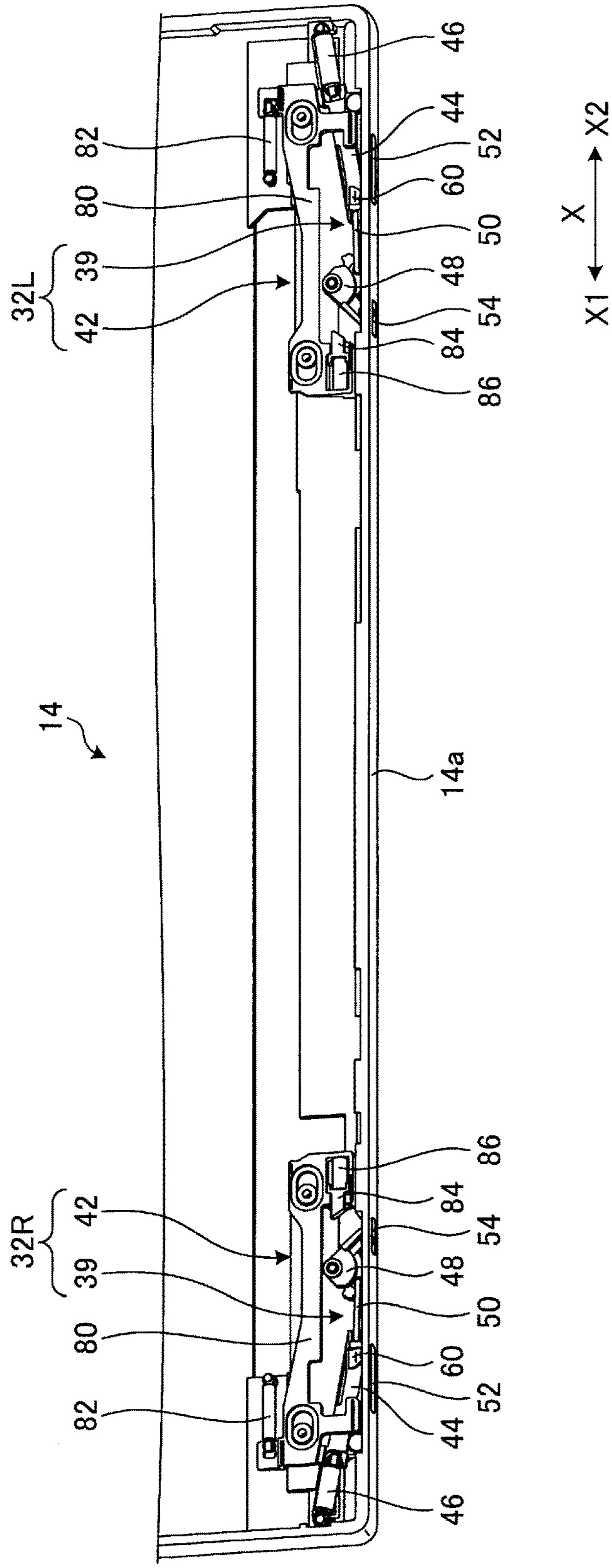
FIG. 3 is a rear view of a lower frame of the upper chassis with a cover omitted.
Figure 4:
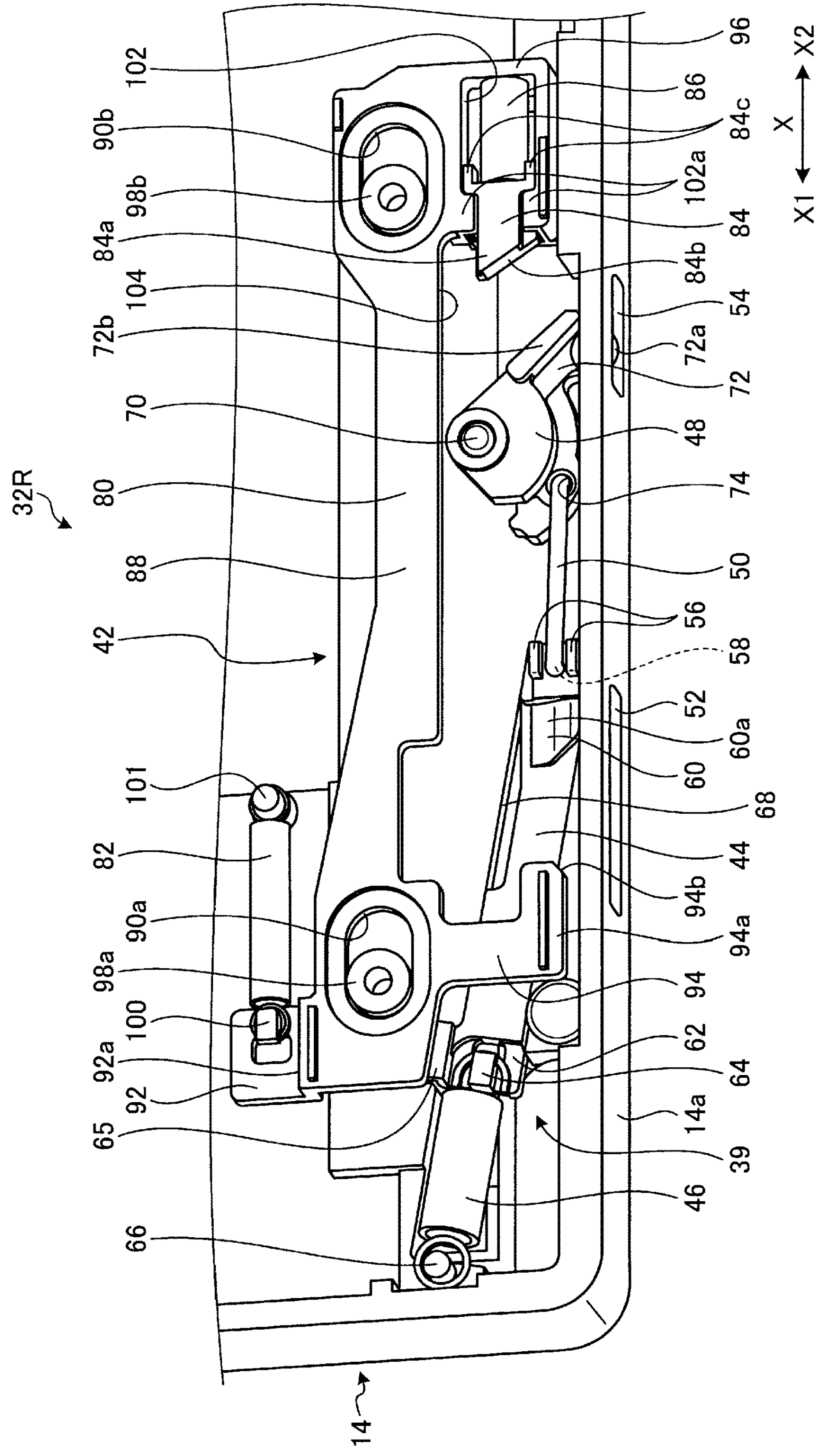
FIG. 4 is a perspective view of an engaging mechanism with the cover omitted, viewed from the rear side.

FIGS. 3 and 4 illustrate a state in which the upper chassis 14 is detached from the lower chassis 18 with the back cover detached, where the engaging mechanism 32R is viewed from the rear side. The engaging mechanism 32R is easy to understand when it is viewed from the rear side because of the arrangement of the constituent elements and therefore is described with reference to FIGS. 3 and 4 illustrating the rear views.

As illustrated in FIGS. 3 and 4, the engaging mechanism 32R has a slider interlocking mechanism 39 and an unlock holding mechanism 42. The slider interlocking mechanism 39 has an engaging slider 44, a coil spring 46, a coupled rotary link 48, and a coupling wire 50. The attachment surface 14*a* of the upper chassis 14 is provided with a post hole (engagement hole) 52 and a pusher hole 54. The coil spring 46 is a tensile spring. In the docking system 30 of the electronic device 10, all coil springs are tensile springs except a compression coil spring 86 described later. Regarding the slider interlocking mechanism 39 and the unlock holding mechanism 42 of the engaging mechanism 32R, the initial positions thereof are assumed to be as illustrated in FIGS. 3 and 4, in other words, as in the state where the upper chassis 14 is separated from the lower chassis 18.

Figure 5:
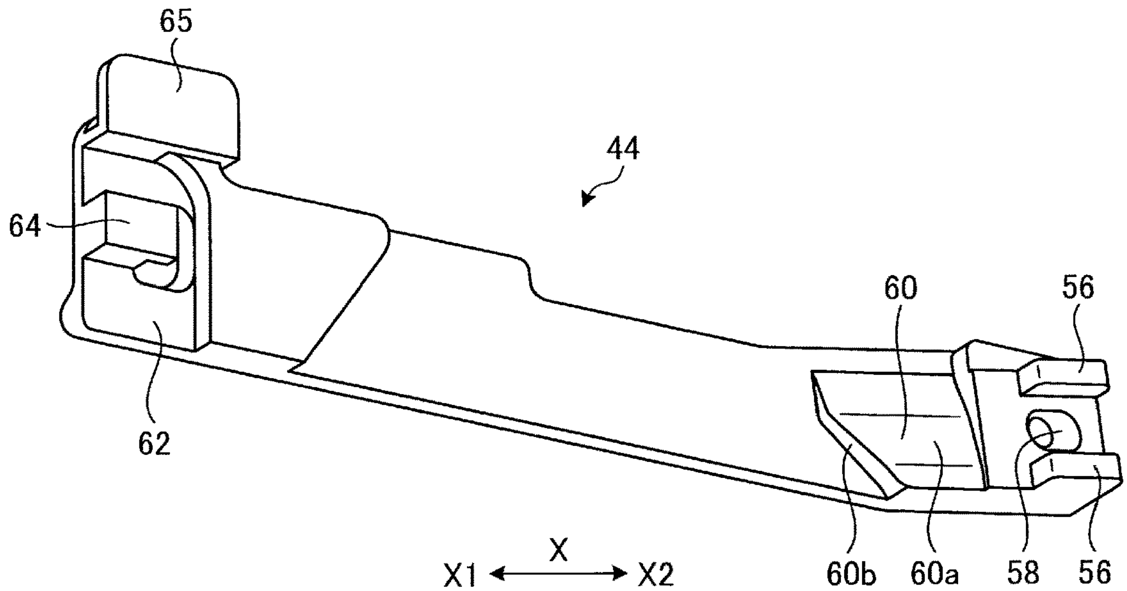
FIG. 5 is a perspective view of an engaging slider.

As illustrated in FIG. 5, the engaging slider 44, which has an elongated flat plate-like shape, includes two projections 56 and a wire hole 58 at an X2-direction end portion and an engaging projection 60 provided adjacent to the wire hole 58. The wire hole 58 is provided in a position between the two projections 56 and an end portion of the coupling wire 50 is fitted into the wire hole 58. The engaging projection 60, which is a portion engaging with the support post 36R, slightly protrudes toward the front side of FIG. 5 (the rear side of the upper chassis 14) with an inclined surface 60*a* formed so as to be gradually thinned from the entrance side of the post hole 52 toward the far side thereof. The inclined surface 60*a* has a wider width in the X direction from the entrance side toward the far side of the post hole 52. The end face 60*b* in the X1 direction of the engaging projection 60 has two stages of inclination with a gentle slope on the entrance side of the post hole 52 and a steep slope on the far side of the post hole 52. Thereby, the engagement amount increases as the slide amount of the engaging slider 44 increases. Therefore, the expansion and contraction of the coil spring 46 is able to eliminate the variation in gaps caused by tolerance or wobbling depending on part and to equalize an increase in the friction coefficient during sliding, thereby enabling a reduction in loss in an elastic force generated by the coil spring 46.

The engaging slider 44 includes a step portion 62, a spring hook 64 provided in the step portion 62, and a guide piece 65 provided above the step portion 62 at an X1-direction end portion of the engaging slider 44. The step portion 62 and the spring hook 64 are portions to which the end portion of the coil spring 46 is fitted. The guide piece 65 functions as a guide for sliding the engaging slider 44. The engaging slider 44 is made of steel material or stainless steel material with the surface hardened by nitriding treatment.

Again, as illustrated in FIG. 4, the engaging slider 44 is arranged slidably in a direction of obliquely at a substantially 15-degree angle within the inclined groove 68 provided in the upper chassis 14 with the coil spring 46 fitted to the spring hook 64 at the X1-direction end portion and with the coupling wire 50 fitted into the wire hole 58 at the X2-direction end portion. The coil spring 46 extends in the same direction as the engaging slider 44 with the X1-direction end portion fitted to the projection 66 and elastically biases the engaging slider 44 in an oblique direction along the inclined groove 68.

The coupled rotary link 48 has a substantially fan shape opening downward 90 degrees in the initial position and is rotatably supported by the shaft support portion 70 located above. The coupled rotary link 48 has a lever (a held portion) 72 whose upper side portion in the X2 direction is extended obliquely downward at a substantially 45 degrees and a wire hole 74 provided substantially at the lower end. One end of the coupling wire 50 is fitted into the wire hole 74. The coupling wire 50 extends in the X direction to couple the engaging slider 44 to the coupled rotary link 48 for interlocking between them. Thereby, when the coupled rotary link 48 rotates counterclockwise, the engaging slider 44 is obliquely displaced downward to the right in the substantially X2 direction against the elastic force of the coil spring 46. Incidentally, the coupling wire 50 is for use in drawing the engaging slider 44 by a rotating motion of the coupled rotary link 48 and therefore only needs to be a member strong in the tensile direction and may have elasticity or flexibility in a compression direction. On the tip under surface of the lever 72, there is formed a semi-arcuate pressed surface 72*a*, which is pressed by the release pusher 38R of the lower chassis 18. On the upper side of the lever 72, there is formed a held piece 72*b*, which is slightly protruding toward the front side (the rear side of the upper chassis 14) in FIG. 4. The use of this type of coupled rotary link 48 facilitates a change in the direction of a motion received from the release pusher 38R and further the coupled rotary link 48 is separated from the engaging slider 44, thereby increasing the degree of freedom in arrangement and enabling the coupled rotary link 48 to be arranged in a narrow place. Incidentally, the coupled rotary link 48 is used in common by the slider interlocking mechanism 39 and the unlock holding mechanism 42.

Subsequently, the unlock holding mechanism 42 is described. When the upper chassis 14 is detached from the lower chassis 18, the unlock holding mechanism 42 temporarily holds the engaging projection 60, which has been separated from a claw portion 110 (see FIG. 6) of the support post 36R, in an unlock position. The unlock holding mechanism 42 holds the engaging projection 60 in the unlock position while the upper chassis 14 is located in the attachment position to the lower chassis 18 and releases the engaging projection 60 from the unlock position when the upper chassis 14 is separated from the lower chassis 18. Thereby, the engaging projection 60 is automatically released from the unlock position and thus a preliminary operation is unnecessary when the upper chassis 14 is attached to the lower chassis 18 next time.

The unlock holding mechanism 42 includes a coupled rotary link 48, an interlocking displacement member 80, a coil spring 82, a holding claw 84, and a compression coil spring 86. The coupled rotary link 48 among them has already been described.

The interlocking displacement member 80, which is a main member in the unlock holding mechanism 42, includes an elongated plate portion 88 extending in the X direction, flat holes 90*a* and 90*b* provided near the right and left ends of the plate portion 88, a first projected piece 92 protruding upward from an X1-direction end portion, a second projected piece 94 protruding downward from the vicinity of the X1-direction end portion, and a third projected piece 96 protruding downward from the X2-direction end portion.

The first projected piece 92 is provided with a spring hook 100 to which one end of the coil spring 82 is fitted.

The coil spring 82 extends from the spring hook 100 in the X2 direction and the other end of the coil spring 82 is fitted to the projection 101, thereby elasticity biasing the interlocking displacement member 80 in the X2 direction. The flat holes 90*a* and 90*b* are holes slightly flat in the X direction and the guide posts 98*a* and 98*b* are mated with the flat holes 90*a* and 90*b* almost without any gap in the vertical direction. Thereby, the interlocking displacement member 80 is slidable within the range of a length in the X direction of the flat holes 90*a* and 90*b* and therefore the interlocking displacement member 80 is displaced to the maximum in the X2 direction by the elastic force of the coil spring 82 when an external force is not applied. The first projected piece 92 is provided with a step 92*a* in the depth direction. The step 92*a* is slidably in contact with the step surface provided inside the upper chassis 14, by which the interlocking displacement member 80 is stably displaced. Moreover, the provision of the step 92*a* causes the coil spring 82 to be arranged in a position a little inside, thereby enabling a reduction in the thickness in the depth direction.

The second projected piece 94 has a lower portion bent in the X2 direction and has an L-shaped form in the rear view. The lower end portion 94*a* bent in the X2 direction in the second projected piece 94 is opposed to the engaging projection 60 in the engaging slider 44 and is provided with a C cut 94*b* at the lower end on the X2 direction side. The C cut 94*b* of the second projected piece 94 and the end face 60*b* of the engaging projection 60 are provided in upper parts than the post hole 52. As described later, the support post 36R is inserted into between the C cut 94*b* and the end face 60*b* so as to press them in such a way that they move away from each other in the opposite direction.

The third projected piece 96 is provided with a groove 102 in which the holding claw 84 and the compression coil spring 86 are arranged. The groove 102 is closed at the X2-direction end with a pair of projections 102*a* opposed to each other at the X1-direction end and with a part between these projections 102*a* opening toward the X1 direction.

The holding claw 84 is a plate piece, which is supported by the pair of projections 102*a* so, as to be slidable in the X direction. The protruding portion 84*a* on the X1 direction side of the holding claw 84 protrudes from the third projected piece 96 and an inclined surface 84*b* is formed with the normal line oriented in the left downward direction in FIG. 4. On the X2-direction side of the holding claw 84, upper and lower L-shaped projections 84*c* are provided to act as a retainer from the groove 102.

The compression coil spring 86 is inserted between the end face on the X2 direction side in the groove 102 and the end face on the X2 direction side in the holding claw 84 to elastically bias the holding claw 84 in the X1 direction. The elastic force of the compression coil spring 86 displaces the holding claw 84 in the X1 direction to the maximum in a state where an external force is not applied with the L-shaped projections 84*c* abutting against the projections 102*a*. The holding claw 84 and the compression coil spring 86 are serially arranged in the X direction, thereby suppressing the vertical height.

A gap 104 in the height direction is provided between the upper surface of the protruding portion 84*a* of the holding claw 84 and the lower surface of the plate portion 88. The protruding portion 84*a* is provided in a position on the upper right side of and slightly spaced apart from the lever 72 in FIG. 4. As described later, when the upper chassis 14 is detached from the lower chassis 18, the lever 72 is pushed up by the release pusher 38R, by which the lever 72 abuts against the protruding portion 84*a* to push the holding claw 84 in the X2 direction and the held piece 72*b* climbs over the protruding portion 84*a* and enters the gap 104 so as to be held.

Substantially, the lower sub-system 34 is described with reference to FIGS. 6 to 11.

As described above, the lower sub-system 34 is provided in the bracket 22 of the lower chassis 18 and on the attachment surface 22*a* and includes the symmetrical support posts 36R and 36L, the symmetrical release pushers 38R and 38L, and the drive unit 40. While the support posts 36R and 36L in the docking system 30 are constituent elements essential for the lower chassis 18, the release pushers 38R and 38L and the drive unit 40 as other constituent elements are allocated to the lower sub-system 34, by which the mechanism of the upper chassis 14 is correspondingly reduced in size and weight so as to be preferable for mobile usages.

Figure 6:
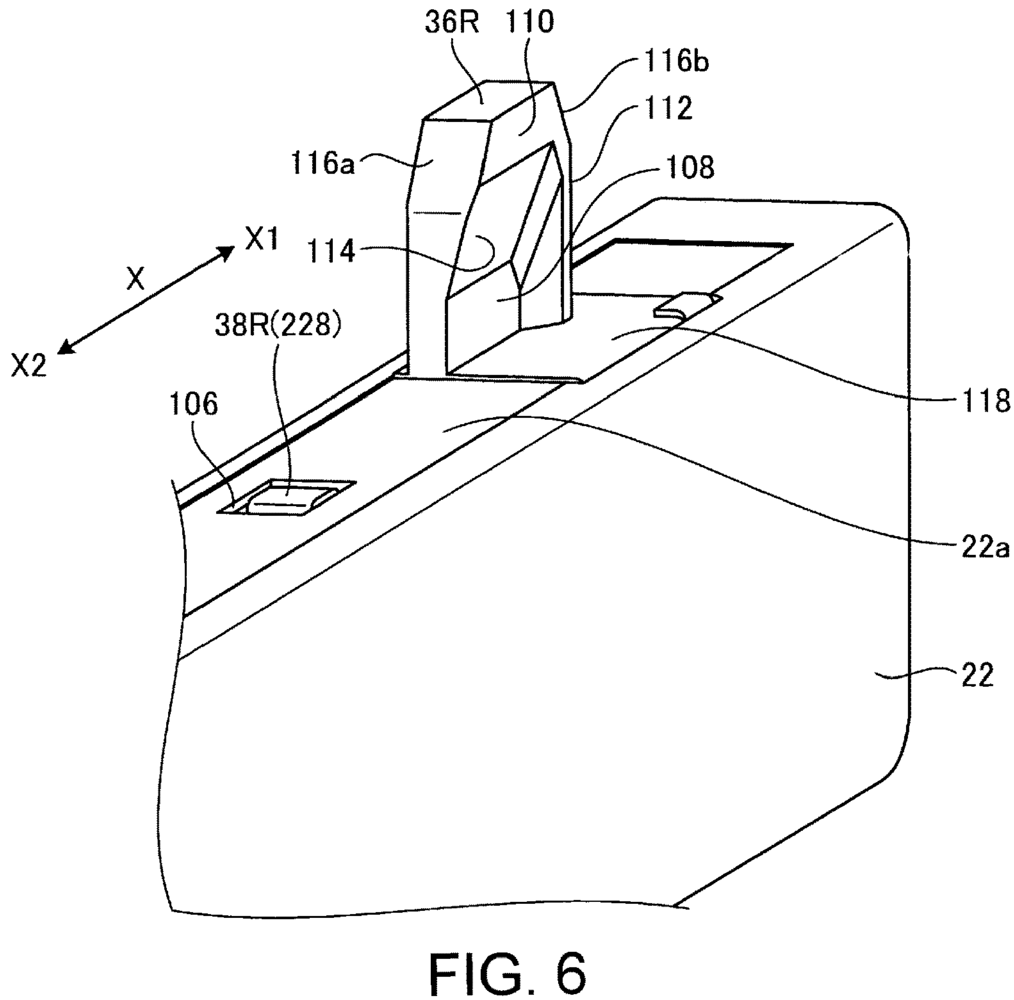
FIG. 6 is a perspective view of a support post and its periphery.

As illustrated in FIG. 6, the support post 36R protrudes upward near the X1-direction end portion on the attachment surface 22*a* of the bracket 22. The attachment surface 22*a* is provided with a pusher hole 106 from which the tip of the release pusher 38R is able to protrude slightly closer to the X2 direction side than the support post 36R. The pusher hole 106 corresponds to the position of the pusher hole 54 (see FIG. 4) of the upper chassis 14.

The support post 36R extends in the X direction and the ratio of dimensions thereof in the X direction and in the vertical direction is approximately 9:5. The support post 36R is relatively low in the vertical direction and is less than half of the vertical height of the bracket 22, and thus the support post 36R is not unnaturally conspicuous on design. The support post 36R has a shape thin in an anteroposterior direction and has a right size for insertion into the opening of the post hole 52.

The support post 36R is provided with a recessed portion 108 on the front side with a part on the upper side of the recessed portion 108 forming a claw portion 110 and a part on the X1 direction side forming an end wall 112. The recessed portion 108 opens in the X2 direction, so that the engaging projection 60 (see FIG. 15) can enter the recessed portion 108. Specifically, the part forming the recessed portion 108 of the support post 36R is formed in such a way that the thickness of a part on the X1 direction side, which is opposite to the X2 direction side, is thicker than the part on the X2 direction side that the engaging projection 60 enters. The recessed portion 108 is closed by the end wall 112 on the opposite side to the side on which the engaging projection 60 enters the recessed portion 108. Accordingly, the engaging projection 60 is not able to enter the recessed portion 108 from the end wall 112 side, thereby preventing the upper chassis 14 from being attached in a reverse direction. Additionally, the thickness provided on the end wall 112 side increases the strength of the support post 36R.

The claw portion 110 extends in the X direction on the tip side of the support post 36R with a part on the lower side forming a gradual inclined surface 114. Regarding the thickness of a part forming the inclined surface 114 of the claw portion 110, the part is formed gradually thicker from the base end side toward the tip side of the support post 36R, by which the normal line of the inclined surface 114 is oriented in a direction inclined with respect to the obliquely lower side on the front side, specifically, with respect to the base end direction of the support post 36R. The inclined surface 114 has a height that is almost a half of the height of the support post 36R and is provided in the intermediate height portion of the support post 36R. At two corners of the support post 36R, in other words, both sides of the claw portion 110, C cuts 116*a* and 116*b* are provided. The claw portion 110 and the end wall 112 have the same maximum thickness and are connected to each other around the C cut 116*b*. The maximum thickness of the claw portion 110 and the end wall 112 is almost twice the thickness of the thinnest part of the recessed portion 108.

Figure 7:
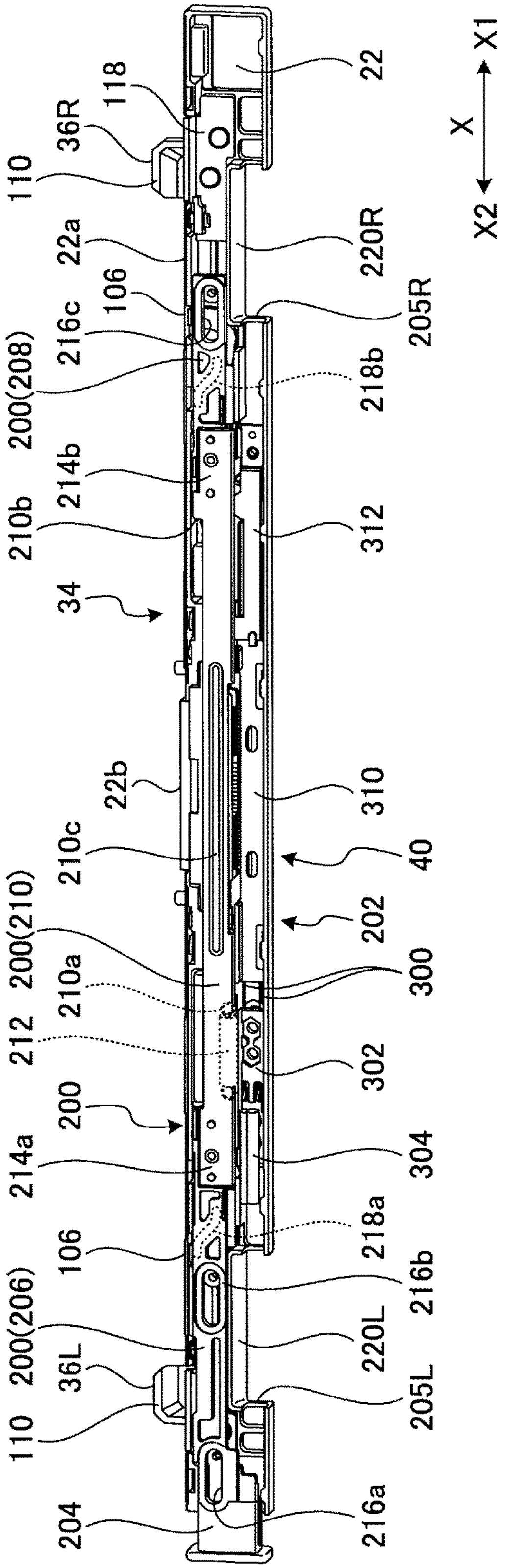
FIG. 7 is a front view of the inside of a bracket.

As illustrated in FIG. 7, the support post 36R has a root portion integrally formed with a base body 118 that constitutes a part of the attachment surface 22*a*. The base body 118 is fixed to the inner surface of the bracket 22 with screws and the support post 36R is integrally and strongly fixed to the bracket 22 and further it is hard to break at its root portion. The support post 36R and the base body 118 are made of steel material or stainless steel material, with the surfaces hardened by nitriding treatment. The support post 36R has two functions of supporting the upper chassis 14 and engaging with the upper chassis 14.

Subsequently, the release pushers 38R and 38L and the drive unit 40 are described.

As illustrated in FIG. 7, the drive unit 40 includes a long release slider 200 extending in the X direction in the upper area in the bracket 22 and an electric mechanism 202 provided mainly in the lower area. The X2-direction end portion of the release slider 200 is a release button 204, which protrudes from the end portion of the bracket 22. Most of the electric mechanism 202 is arranged in a lower half area in the bracket 22. Specifically, the release slider 200, the lower connector 22*b*, and the release pushers 38R and 38L are mainly arranged in the upper half in the bracket 22, and the electric mechanism 202 is mainly arranged in the lower half with hinge areas 205R and 205L secured where the hinge 20 (see FIG. 1) is arranged, thereby implementing a lean and efficient layout. In the drive unit 40, an initial position is defined as a position in a state where the release button 204 is not pressed and the electric mechanism 202 is not electrically driven.

The bracket 22 is designed to be a little shorter than the lower chassis 18 in the X2 direction with the formation of a dent 18*b*, into which the release button 204 is able to be depressed in the X1 direction. The end portion of the release button 204 is flush with the end portion of the lower chassis 18 during non-operation, thereby implementing a natural appearance and preventing the end portion from being unexpectedly pushed into the inside.

The release slider 200 includes a first slider 206 arranged on the X2 direction side, a second slider 208 arranged on the X1 direction side, and a third slider 210 coupling these sliders in the central portion. The release slider 200, which is formed of the first slider 206, the second slider 208, and the third slider 210 integrated with each other, extends in the length direction of the attachment surface 22*a* and is elastically biased in the X2 direction by the coil spring 212. The release slider 200 is operable by either of the release button 204 as a manual operation unit and the electric mechanism 202. Moving the release slider 200 in the X1 direction against the elastic force drives the release pushers 38R and 38L and the coupled rotary link 48 and moves the engaging projection 60 to the unlock position where the engagement with the claw portion 110 is released.

The release slider 200 extending in the X direction has a simple structure and is easy to transmit an action force, thereby suppressing the vertical height. Moreover, the operating force may be applied to any part of the long release slider 200, thereby increasing the degree of freedom in arrangement of the manual operation unit and the electric mechanism 202. Furthermore, in the long release slider 200, an operating force is easily transmitted to the release pushers 38R and 38L at two places horizontally spaced apart from each other, and even in the case of three or more places, the present invention inapplicable.

The release slider 200 and the release pushers 38R and 38L constitute a release mechanism that separates the upper chassis 14 from the lower chassis 18 by the above action. The manual operation unit for displacing the release slider 200 is a release button 204 integrally connected to the release slider 200, having a simple structure. The manual operation unit is not limited to the release button 204, but may be a part interlocking with a rotary lever or the like, for example.

The third slider 210 is provided substantially in the central portion in the bracket 22 with the X2-direction end fixed to the X1-direction end of the first slider 206 and with the X1-direction end fixed to the X2-direction end of the second slider 208. The coil spring 212 is arranged extending on the rear side of the third slider 210 in the X direction and one end is fitted to a projection 210*a* on the rear side of the third slider 210 to elastically bias the third slider 210 in the X2 direction. The upper surface of the third slider 210 near the X1-direction end portion slightly protrudes upward, thereby forming a small step 210*b*. The third slider 210 is formed of a thin metal sheet to avoid interference with the lower connector 22*b* and has an elongated bulging portion 210*c* in the X direction to increase the strength in a portion facing the lower connector 22*b* in the center, and both vertical ends of other portions are slightly bent.

Figure 8:
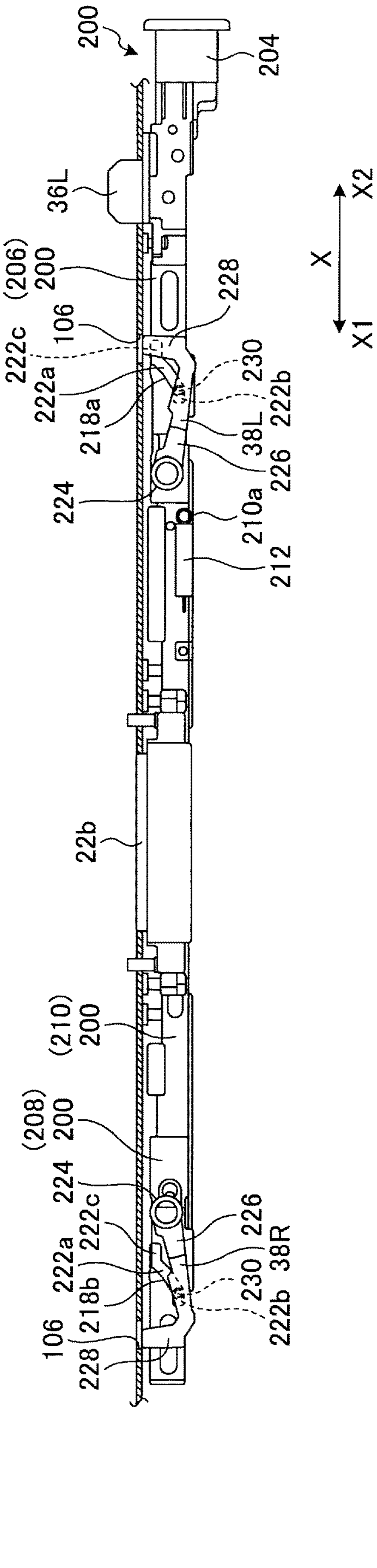
FIG. 8 is a rear view of a connector, a release slider, a release pusher, and a support post in a state where a release button has not yet pressed.

As illustrated in FIGS. 7 and 8, the first slider 206 includes a release button 204 provided in the X2-direction end portion, a coupling portion 214*a* provided in the X1-direction end portion, two flat holes 216*a* and 216*b*, and a guide groove 218*a* provided on the rear. The flat holes 216*a* and 216*b* are provided slightly spaced apart from each other in the X direction.

The second slider 208 includes a coupling portion 214*b* provided in the X2-direction end portion, a flat hole 216*c* provided near the X1-direction end portion, and a guide groove 218*b* provided on the rear. The coupling portions 214*a* and 214*b* are coupled to both ends of the third slider 210.

The flat holes 216*a*, 216*b*, and 216*c* are slightly flat in the X direction having the same shape. Guide posts not illustrated are mated with the flat holes vertically almost without any gap. Thereby, the release slider 200 is slidable within the range of the X-direction length of the flat holes 216*a*, 216*b*, and 216*c* and is displaced to the maximum in the X2 direction due to an elastic force of the coil spring 212 when an external force is not applied. The bracket 22 is provided with narrow grooves 220R and 220L formed narrow to secure hinge areas 205R and 205L. The first slider 206 and the second slider 208 are partially fitted into the narrow grooves 220R and 220L to be supported and is stably displaceable in the X direction.

As illustrated in FIG. 8, a guide groove 218*a* provided on the rear of the first slider 206 and a guide groove 218*b* provided on the rear of the second slider 208 have the same shape with an inclined groove 222*a* in the center and short X-direction grooves 222*b* and 222*c* at both ends continuously formed. The inclined groove 222*a* in the center has an arcuate shape with an inclination of about 45 degrees oriented obliquely upward from the X1 direction toward the X2 direction and slightly convex downward. The X-direction grooves 222*b* are provided near the lower ends of the first slider 206 and the second slider 208, and the X-direction grooves 222*c* are provided partially opening at the upper end. For the X-direction groove 222*b* and the X-direction groove 222*c*, a distance difference in the vertical direction between them is secured to the maximum. The guide grooves 218*a* and 218*b* are used to fit projections 230 (see FIG. 10) therein to rotate the release pushers 38R and 38L and the X-direction grooves 222*b* and 222*c* have a function of limiting the rotation range.

The first slider 206 and the second slider 208 are made of resin and are a little thick because of the necessity of forming the flat holes 216*a*, 216*b*, and 216*c* and the guide grooves 218*a* and 218*b* and due to the presence of an enough space.

Figure 9:
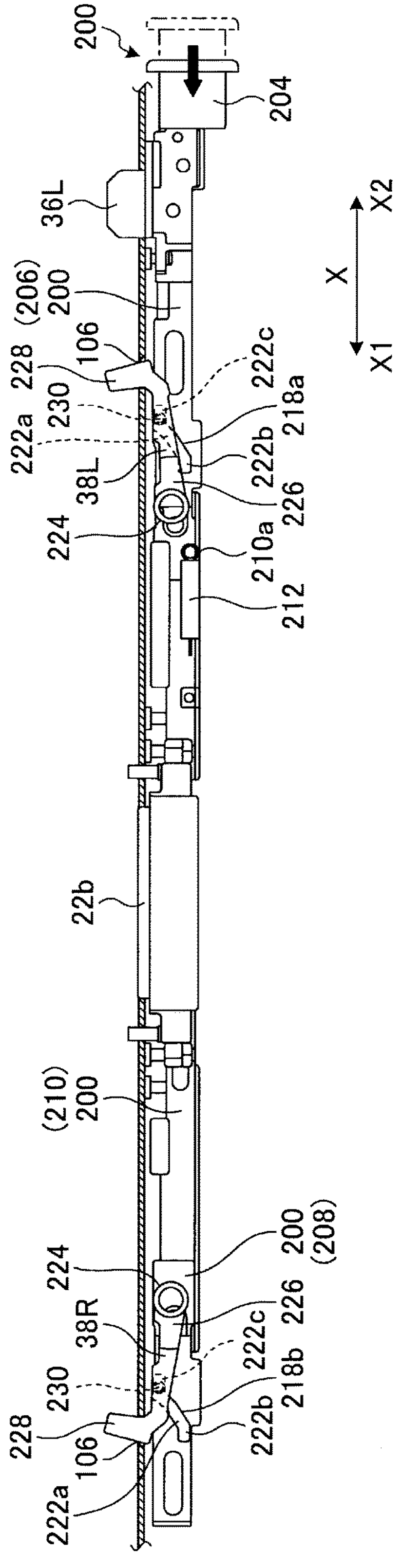
FIG. 9 is a rear view of the connector, the release slider, the release pusher, and the support post in a state where the release button has been pressed.
Figure 10:
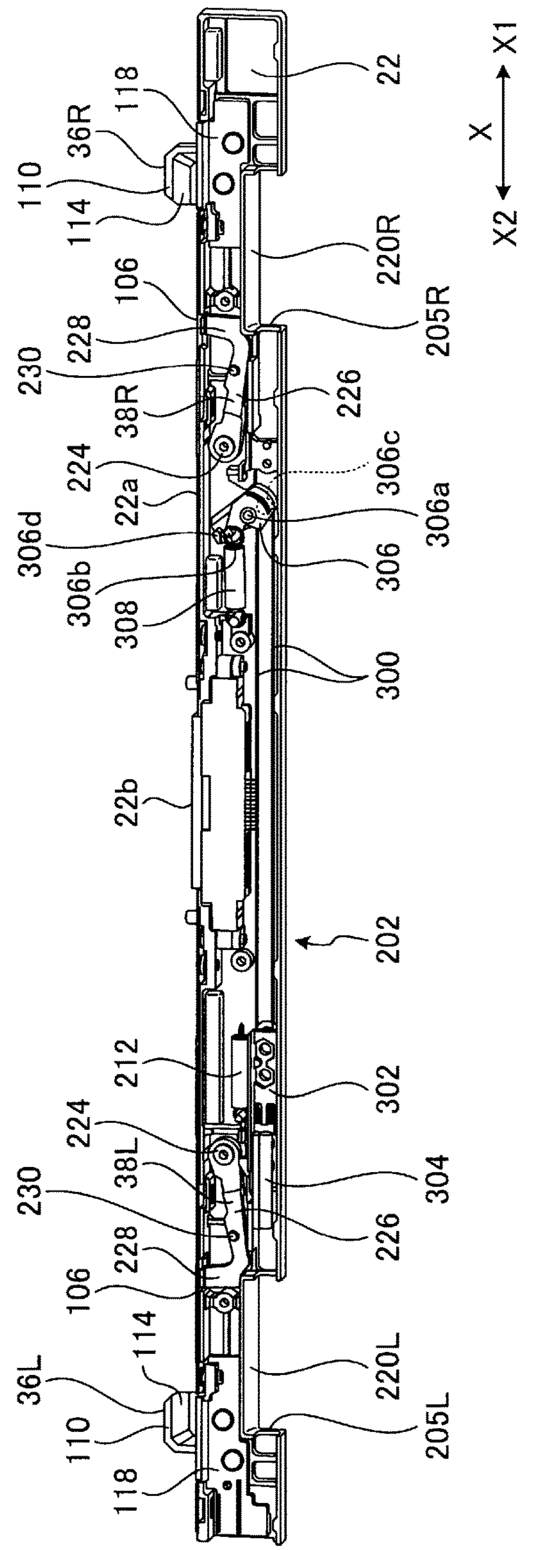
FIG. 10 is a front view of the inside of the bracket with the release slider, a nylon cover, and a stainless steel cover omitted.

As illustrated in FIGS. 8, 9, and 10, the release pusher 38R is a substantially L-shaped member including a shaft support portion 224, an arm 226 extending from the shaft support portion 224, and a pusher 228 provided at the tip of the arm 226. Moreover, the release pusher 38R has a projection 230 on the front side of the arm 226 in the substantially central portion thereof.

The shaft support portion 224 is provided near the upper end in the bracket 22, the arm 226 extends in the substantially X1 direction, and the pusher 228 is substantially perpendicular to the arm 226 and oriented upward. The projection 230 is mated with the guide groove 218*b* of the second slider 208 and the displacement of the release slider 200 in the X direction causes the release pusher 38R to rotate following it.

Specifically, as illustrated in FIG. 8, when the release slider 200 is displaced to the maximum in the X2 direction by the elastic force of the coil spring 212 with no external force applied, the arm 226 is inclined slightly downward in the X1 direction. In this state, the tip of the pusher 228 is flush with the attachment surface 22*a* and is exposed from the pusher hole 106 (see FIG. 6).

As illustrated in FIG. 9, when the release button 204 is pressed, the release slider 200 is displaced to the maximum in the X1 direction against the elastic force of the coil spring 212, the arm 226 is inclined slightly upward in the X1 direction, and the pusher 228 protrudes from the pusher hole 106. If the release button 204 is released, the state of FIG. 8 is resumed. The release pusher 38L is symmetrical to the release pusher 38R and is driven by the guide groove 218*a* of the first slider 206 similarly.

Subsequently, the electric mechanism 202 of the drive unit 40 will be described.

As illustrated in FIG. 10, most of the electric mechanism 202 is provided in a lower half area of the bracket 22 and between the right and left hinge areas 205R and 205L and includes a shape memory alloy (SMA) wire 300, a wire holder 302, an insulator 304, an electric rotary link 306, and a coil spring 308. The SMA wire 300 and the electric rotary link 306 are partially covered with the nylon cover 310 (see FIG. 7) and the stainless steel cover 312. The wire holder 302 and the insulator 304 are provided on the X2 direction side and the electric rotary link 306 is provided on the X1 direction side with the SMA wire 300 routed between them. The electric rotary link 306 is made of Aluminum alloy, having appropriate strength and durability.

Both ends of the SMA wire 300 are connected to the wire holder 302. Using the wire holder 302 as a relay terminal block, the SMA wire 300 is electrically connected to an electric circuit and a control unit, which are not illustrated, passing both sides of the insulator 304. The wire holder 302 and the insulator 304 each have a shape that is little long in the X direction and short in the vertical direction. The electric rotary link 306 is located a little closer to the X2 direction than the release pusher 38R and includes a shaft support portion 306*a*, a hook 306*b*, a projection 306*c*, and a working piece 306*d*. The shaft support portion 306*a* is provided at a substantially intermediate height in the bracket 22. The hook 306*b* and the projection 306*c* are each provided on the opposite side of the shaft support portion 306*a* and their distances from the shaft support portion 306*a* are substantially equal to each other. The working piece 306*d* is a small projection protruding to the front at the tip on the side where the hook 306*b* is provided and is arranged in a position slightly spaced apart from the step 210*b* (see FIG. 7) in the X2 direction in the initial position.

The electric rotary link 306 is a member rotating at substantially 90 degrees around the shaft support portion 306*a* with the hook 306*b* and the working piece 306*d* displaced on the upper side and with the projection 306*c* displaced on the lower side. The SMA wire 300 is routed so as to be vertically parallel to each other along a passage in which the SMA wire 300 is half wrapped around the projection 306*c* and then turns back and has an enough length. The coil spring 308 is fitted at one end to the hook 306*b* to elastically bias the electric rotary link 306 counterclockwise, thereby preventing the SMA wire 300 from slacking.

The SMA wire 300 is made of shape-memory alloy and has a property of recovering the original shape after being heated to a predetermined temperature or higher. In this embodiment, the SMA wire 300 has a shape in which the wire is extended in the longitudinal direction when non-energized and recovers the original shape in which the wire is contracted in the longitudinal direction by Joule heat generated by application of predetermined electric current.

Figure 11:
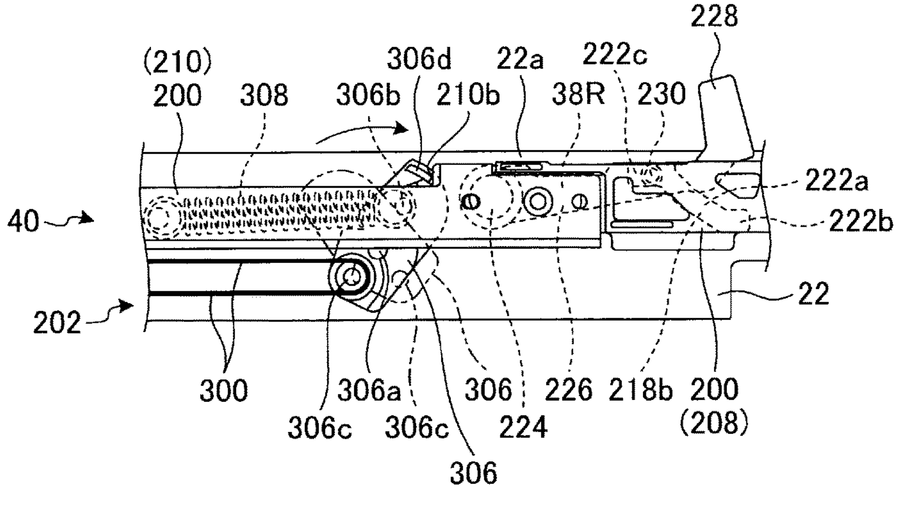
FIG. 11 is a partially-enlarged front view illustrating an electric mechanism in operation with the cover omitted.

As illustrated in FIG. 11, the control unit controls whether or not the electric current is applied and controls the energizing time, by which the SMA wire 300 is contracted by elastic deformation and biases the electric rotary link 306 so as to rotate clockwise via the projection 306*e* to function as an actuator. Thereby, the electric rotary link 306 rotates clockwise against the elastic force of the coil spring 308, the working piece 306*d* presses the step 2106, the release slider 200 is displaced in the X1 direction, and the pusher 228 of the release pusher 38R protrudes from the attachment surface 22*a*.

The SMA wire 300 is able to generate proper power with a simple and lightweight structure and is routed along the X direction, thereby securing an appropriate length and suppressing the vertical height.

Moreover, the interposition of the electric rotary link 306 facilitates the transmission of the action force of the SMA wire 300 to the release slider 200. Furthermore, the coil spring 308 fitted to the electric rotary link 306 applies appropriate pre-tension to the SMA wire 300, thereby preventing slack thereof. Still further, the coil spring 308 and the SMA wire 300 extend in the same X2 direction viewed from the electric rotary link 306, thereby making the electric mechanism 202 compact.

The electric rotary link 306 has a structure of pressing a part of the release slider 200 in the X1 direction and remains in the initial position when the release slider 200 is moved in the X1 direction by the operation of the release button 204 without any interference. To the contrary, the release button 204 moves interlocking with the motion of the electric mechanism 202, which, however, does not cause any inconvenience. The electric mechanism 202 is only required to press and displace the step 210*b*. For example, the electric mechanism 202 may rotate the electric rotary link 306 with a motor or may press the step 210*b* directly using a solenoid.

The following describes the actions of the electronic device 10 and the docking system 30 configured as described above. First, the operation and action of attaching the upper chassis 14 to the lower chassis 18 are described.

Figure 12:
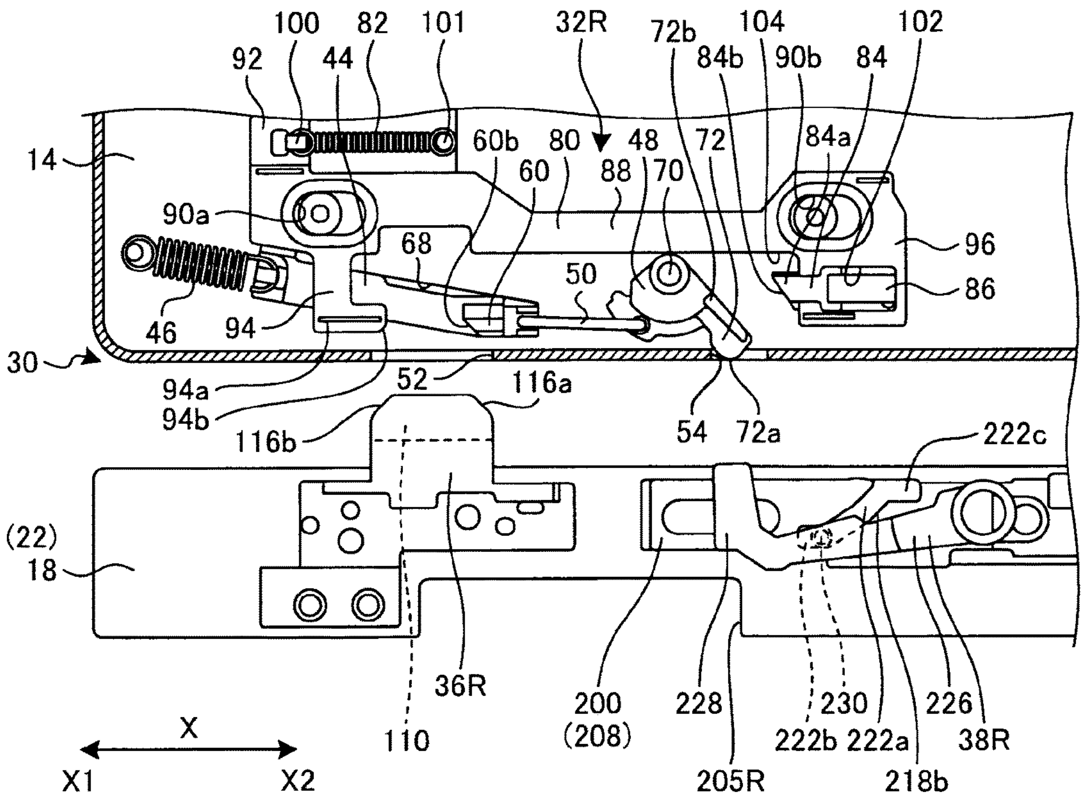
FIG. 12 is a front view of a docking system in a state where the upper chassis is not attached to the lower chassis yet with the cover omitted.

As illustrated in FIG. 12, when the upper chassis 14 is spaced apart from the lower chassis 18, the engaging slider 44 in the initial position is elastically drawn by the coil spring 46 slightly obliquely upward in the X1 direction and the end face 60*b* of the engaging projection 60 is arranged above the C cut 116*a* of the support post 36R inserted from the post hole 52. Moreover, the coupled rotary link 48 is biased clockwise by the coupling wire 50, by which the lever 72 faces obliquely downward in the X2 direction with the pressed surface 72*a* at the tip exposed downward from the pusher hole 54.

Furthermore, the interlocking displacement member 80 is elastically drawn in the X2 direction by the coil spring 82, and the C cut 94*b* of the second projected piece 94 is arranged above the C cut 116*b* of the support post 362. Incidentally, the state of the upper chassis 14 in FIG. 12 is the same as that of the initial position illustrated in FIG. 4.

Figure 13:
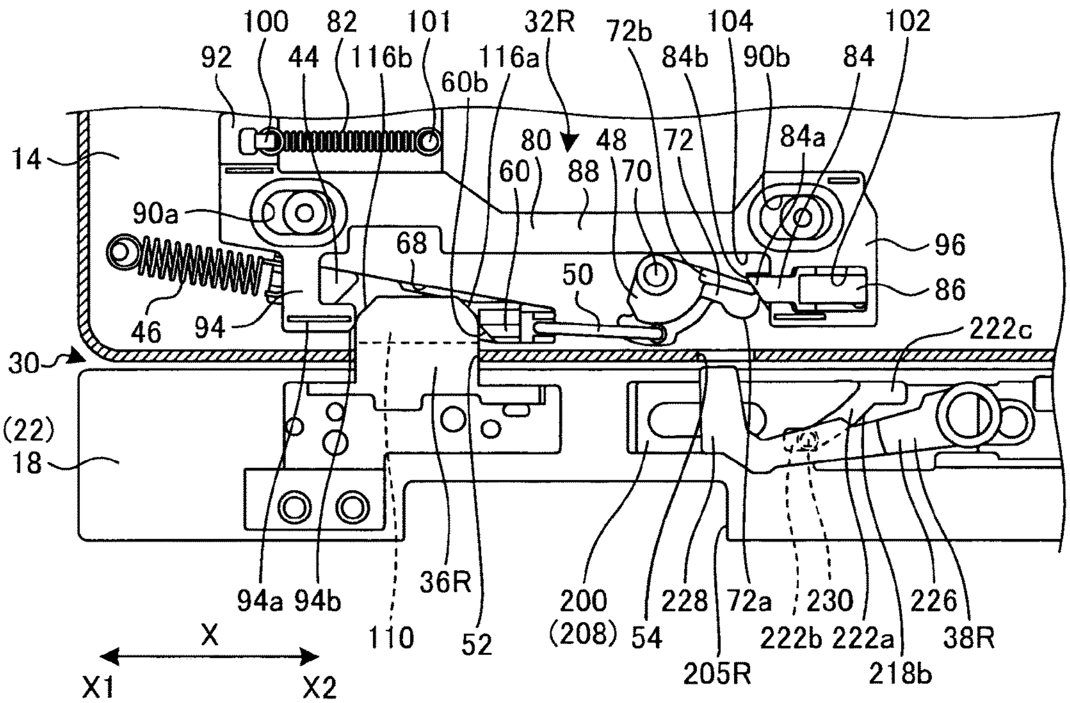
FIG. 13 is a front view of the docking system in the middle of attaching the upper chassis to the lower chassis with the cover omitted.

Subsequently, as illustrated in FIG. 13, the upper chassis 14 is moved downward to insert the support post 36R into the post hole 52. At this time, the inclined end face 60*b* of the engaging projection 60 is pressed abutting against the C cut 116*a* of the support post 36R and moves along the X2-direction side surface of the support post 36R. Thereby, the engaging slider 44 is displaced slightly obliquely downward in the X2 direction along the inclined groove 68 against the elastic force of the coil spring 46.

Moreover, the C cut 94*b* of the second projected piece 94 is pressed abutting against the C cut 116*b* of the support post 36R to move along the X1-direction side surface of the support post 36R. Thereby, the interlocking displacement member 80 is displaced in the X1 direction against the elastic force of the coil spring 82. The entire interlocking displacement member 80 is displaced in the X1 direction, by which the holding claw 84 arranged in the third projected piece 96 is also displaced in the X1 direction and thus the protruding portion 84*a* enters the rotation range of the lever 72 of the coupled rotary link 48. The interlocking displacement member 80 is displaced in the X direction (the direction orthogonal to the attachment direction), thereby enabling a reduction in the vertical height. Furthermore, both of the engaging slider 44 and the interlocking displacement member 80 can be displaced by using both side surfaces of the support post 36R reasonably.

On the other hand, although the coupled rotary link 48 coupled through the coupling wire 50 rotates counterclockwise along with the displacement of the engaging slider 44, the rotation angle is relatively small and the lever 72 does not abut against the inclined surface 84*b* of the protruding portion 84*a* or, even if slightly abutting against the inclined surface 84*b*, the lever 72 does not climb over the protruding portion 84*a*.

Figure 14:
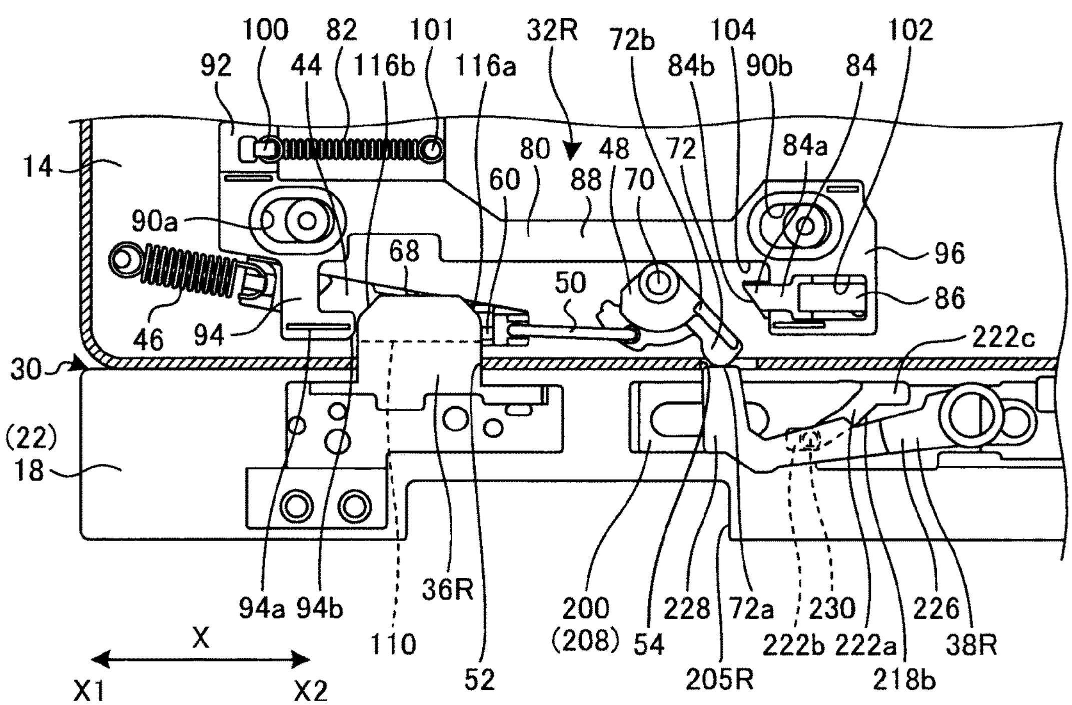
FIG. 14 is a front view of the docking system in a state where the upper chassis is attached to the lower chassis with the cover omitted.

Furthermore, when the upper chassis 14 is moved further downward as illustrated in FIG. 14, the engaging projection 60 climbs over the widest part of the claw portion 110 of the support post 36R and thus temporarily released from restriction and the engaging slider 44 is drawn obliquely upward by the coil spring 46 so as to be displaced quickly and appropriately swiftly.

Figure 15:
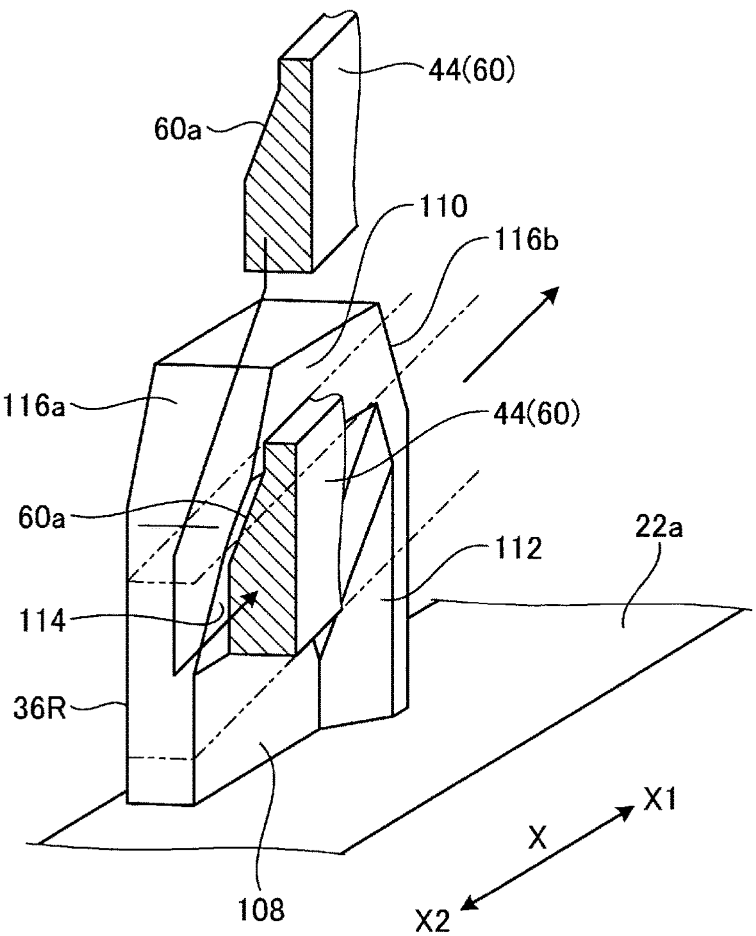
FIG. 15 is a partial cross-sectional perspective view of a post support portion and an engaging projection in a locked state.
Figure 16:
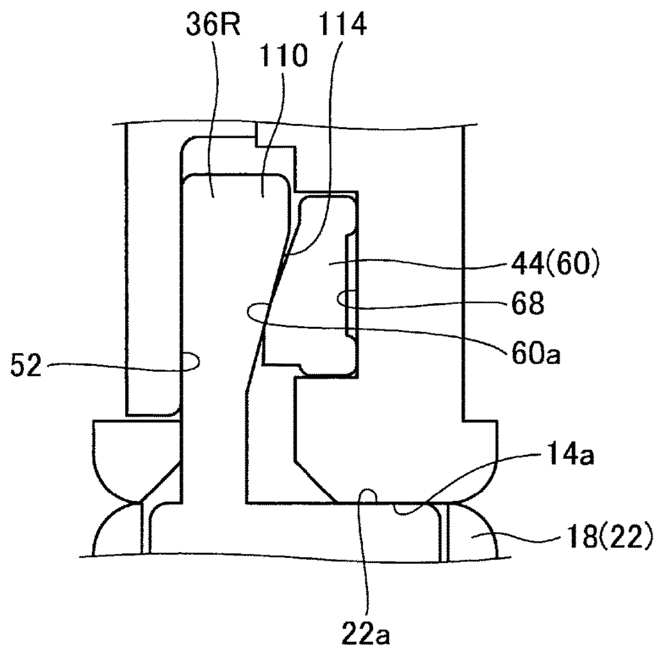
FIG. 16 is a sectional side view of a post support portion and a slider interlocking mechanism in a locked state.

Furthermore, as illustrated in FIGS. 15 and 16, the inclined surface 114 of the support post 36R abuts against the inclined surface 60*a* of the engaging projection 60. Thereby, the inclined surface 60*a* on the lower side presses the inclined surface 114 on the upper side vertically upward, and the upper chassis 14 is pressed against the lower side, by which the attachment surface 22*a* is put in appropriately close contact with the attachment surface 14*a* without a gap. Furthermore, due to this engagement, the support post 36R is pressed also to the front side and thus pressed against the side surface of the post hole 52, and the engaging projection 60 is pressed also to the rear side and thus pressed against the side surface of the inclined groove 68, by which they are put in close contact with each other without a gap. The inclined surface 60*a* and the inclined surface 114 stably and strongly abut against each other due to a wedge action and an appropriately swift displacement, by which the upper chassis 14 and the lower chassis 18 can be fixed. Although the inclined surface 60*a* and the inclined surface 114 strongly abut against each other by the wedge action, the engaging slider 44 and the support post 36R are made of steel material or stainless steel material and further nitrided, thus being extremely strong, less wearing, and long-life.

Generally, the term “wedge action” has two meanings. Specifically, one is an action of preventing one of two objects from coming closer to the other object in a state where at least one of abutting surfaces of the two objects tends to bite an inclined surface and the other is an action of dividing a target by pushing an acute object into a clearance part. Naturally, the wedge action means the former in this specification.

As illustrated in FIG. 16, the inclined surface 114 has a slightly gentler slope than the inclined surface 60*a* with the vertical direction as a reference and the surfaces appropriately abut against each other. Although a surface contact does not occur between surfaces having different inclination angles in a strictly geometrical meaning, the difference in the inclination angle between the inclined surface 114 and the inclined surface 60*a* is small and the surfaces tend to press each other, and therefore substantially a surface contact occurs in a certain area stably with a slight elastic deformation. Moreover, the engaging projection 60 forming the inclined surface 60*a* is thinned gradually from the entrance side toward the far side of the post hole 52, while the claw portion 110 forming the inclined surface 114 is made thicker gradually from the base end side to the tip side of the support post 36R, by which the both inclined surfaces easily abut against and engaged with each other.

The inclined surface 60*a* and the inclined surface 114 are fixed to each other without a gap and firmly by the wedge action. Therefore, the upper chassis 14 is fixed to the bracket 22 without wobbling in an anteroposterior direction and thus the elevating operation with the hinge can be stably performed. Therefore, the support posts 36R and 36L are able to be formed low and are not conspicuous on design, which further leads to a small insertion amount and a small extraction amount when the upper chassis 14 is attached to or detached from the lower chassis 18.

Since the pressing of the inclined surface 60*a* includes a force component of pressing the inclined surface 114 upward, the upper chassis 14 is pressed downward, by which the attachment surface 14*a* and the attachment surface 22*a* are put in contact with each other without a gap stably.

Furthermore, the sliding direction in which the engaging projection 60 is guided due to the elastic biasing is oblique relative to the extending direction (X direction) of the claw portion 110 and is a direction of biasing from the entrance side toward the far side of the post hole 52, by which the upper chassis 14 engages with the lower chassis 18 without a gap both horizontally and vertically. Moreover, pulling the upper chassis 14 in a direction of being separated from the lower chassis 18 causes the engaging slider 44 to be biased in the engagement direction and the engagement of the engaging slider 44 is further reinforced, thereby preventing unexpected separation. Naturally, the upper chassis 14 does not drop even if it is directed downward.

Furthermore, although the support post 36R receives a force in the X1 direction from the engaging projection 60, the left support post 36L receives a force in the X2 direction symmetrically to balance, by which the upper chassis 14 is stable to the lower chassis 18 horizontally, too.

Moreover, in attachment, the engaging projection 60 climbs over the widest part of the claw portion 110 of the support post 36R, by which the engaging slider 44 is drawn obliquely upward by the coil spring 46 and is displaced instantaneously and rapidly, which provides a small sound and an appropriate operation feeling and enables a user to confirm the completion of an appropriate engagement.

The operation of attaching the upper chassis 14 to the lower chassis 18 is completed only by pushing the upper chassis 14 with the positions of the support posts 36R and 36L matched with the post holes 52 by a single operation without any preliminary operation.

The following describes an operation and an action of detaching the upper chassis 14 from the lower chassis 18. The detaching operation is able to be performed by either of a depressing operation of the release button 204 and an automatic operation with the electric mechanism 202. First, the action of the release button 204 is described.

Figure 17:
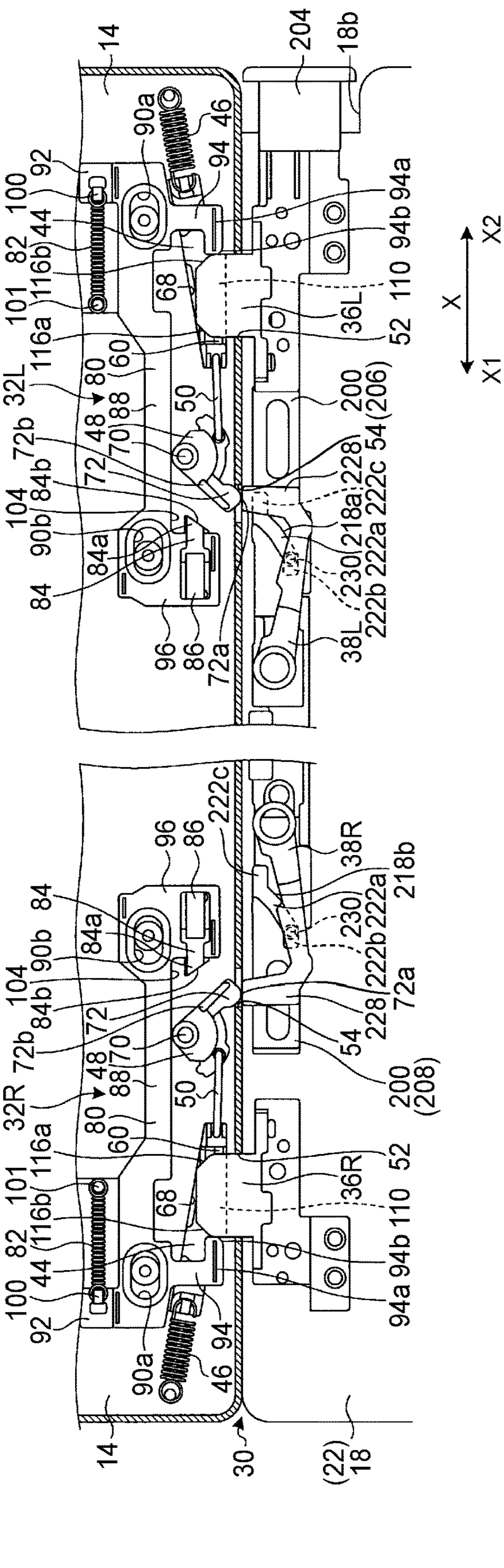
FIG. 17 is a rear view of the docking system in a state where the release button is not pressed yet with the cover omitted.

As illustrated in FIG. 17, in a state where the upper chassis 14 is fitted to the lower chassis 18, the release slider 200 is elastically biased by the coil spring 212 so as to be displaced in the X2 direction and the depressed end face of the release button 204 is flush with the X2-direction side surfaces of the upper chassis 14 and the lower chassis 18. In this condition, each of the pushers 228 of the release pushers 38R and 38L are placed in a down state with the top exposed upward from the pusher hole 106. On the other hand, the lever 72 of the coupled rotary link 48 is also placed in a down state with the pressed surface 72*a* exposed downward from the pusher hole 54. Furthermore, the interlocking displacement member 80 is displaced in the X1 direction, the protruding portion 84*a* of the holding claw 84 is also displaced in the X1 direction, and the inclined surface 84*b* is within the rotation range of the lever 72.

Figure 18:
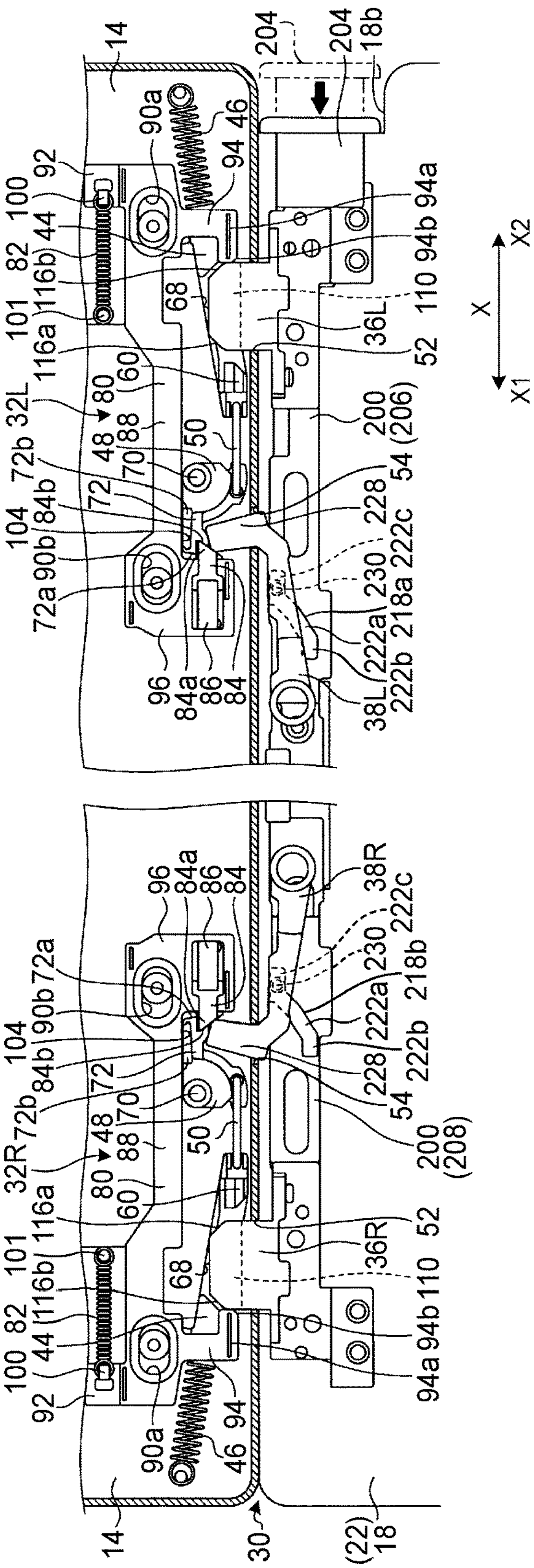
FIG. 18 is a rear view of the docking system in a state where the release button is pressed with the cover omitted.

As illustrated in FIG. 18, pushing the release button 204 in the X1 direction causes the release slider 200 integrated with the release button 204 to be also displaced in the X1 direction against the elastic force of the coil spring 212. Thereby, the guide groove 218*a* of the first slider 206 and the guide groove 218*b* of the second slider 208 are also displaced in the X1 direction, the respective projections 230 fitted into the guide grooves 218*a* and 218*b* are pushed upward, and the respective pushers 228 of the release pushers 38R and 38L protrude upward from the pusher holes 106. Thereby, the operating force of the separating, operation of the lower chassis 18 is transmitted to the upper chassis 14.

Incidentally, the projection 230 does not move upward only by slightly pushing the release button 204 with a careless touch, but is only displaced relatively horizontally in the X-direction groove 222*b* thereby, and such a slight push does not release the engagement between the engaging projection 60 and the claw portion 110 or not decrease the engaging force.

Furthermore, when the release slider 200 is displaced in the X1 direction by pressing the release button 204, the step 210*b* is spaced apart from the working piece 306*d* of the electric rotary link 306, and therefore the pressing, operation of the release button 204 does not interfere with the electric mechanism 202, and the SMA wire 300 is maintained in an appropriate tense state.

In the upper chassis 14, the pusher 228 presses the pressed surface 72*a* of the lever 72 upward and the coupled rotary link 48 rotates at about 45 degrees. The engaging slider 44 coupled to the coupled rotary link 48 via the coupling wire 50 comes obliquely downward along the inclined groove 68 and the engagement between the engaging projection 60 of the engaging slider 44 and the claw portion 110 is released. The slide amount of the engaging slider 44 is set to an appropriately high value. When viewed in the attachment/detachment direction (viewed in the vertical direction), the engaging projection 60 is displaced up to the unlock position not overlapped by the support post 36R, 36L.

At this time, the held piece 72*b* of the lever 72 abuts against and presses the inclined surface 84*b* of the holding claw 84 and pushes the holding claw 84 into the far side of the groove 102 against the elastic force of the compression coil spring 86. Then, the held piece 72*b* climbs over the protruding portion 84*a* of the holding claw 84 and enters the gap 104 until the completion of the moving of the engaging projection 60 by the release slider 200, and the holding claw 84 is pushed out again by the compression coil spring 86 and the upper surface of the holding claw 84 holds the held piece 72*b*. In this manner, even after the user completes the depressing operation of the release button 204 and leaves hold of his/her hands and the pusher 228 comes down, the held piece 72*b* is also held in the gap 104.

As described above, according to the action of the unlock holding mechanism 42 including the interlocking displacement member 80 and the holding claw 84, the held piece 72*b* is held in the gap 104 even after performing the operation of releasing the engagement between the engaging projection 60 and the claw portion 110 with the release mechanism, by which the engaging projection 60 is reliably held in the unlock position, and therefore the user does not need to perform the operation of the release button 204 and the separation of the upper chassis 14 at the same time.

Moreover, although the release pushers 38R and 38L rotate by the guide grooves 218*a* and 218*b*, the X-direction groove 222*c* stably regulates the rotation range and the rotation does not push up the coupled rotary link 48 unnecessarily, by which the lever 72 rotates at about 45 degrees and stops in a position where the upper surface of the lever 72 is substantially horizontal. Therefore, the lever 72 does not push up the plate portion 88 of the interlocking displacement member 80 and the upper chassis 14 is not unexpectedly separated from the lower chassis 18 at this time.

In this manner, in the depressing operation of the release button 204, the upper chassis 14 does not automatically come out of the lower chassis 18 even after the release of the engagement between the engaging projection 60 and the claw portion 110, and therefore the upper chassis 14 is held in the attachment position by the support posts 36R and 36L and does not fall without being supported by a hand. Therefore, the operation with one hand is enabled and a user is able to perform a stable operation even if the user has a baggage in one hand or is handicapped in a hand.

Furthermore, the operating force of the release button 204 is only required to be a small force for getting the slider interlocking mechanism 39 and the holding claw 84 to work independently of the weight of the upper chassis 14. Furthermore, at this time point, the upper chassis 14 is not separated from the lower chassis 18, and therefore the electrical connection between them can be maintained.

Thereafter, when the user pulls the upper chassis 14 from the lower chassis 18 upward, the engaging projection 60 is maintained in the unlock position spaced apart from the claw portion 110 and therefore the user is able to pull the upper chassis 14 out substantially smoothly.

Thereafter, the interlocking displacement member 80, which has been displaced in the X2 direction, is released by separation of the second projected piece 94 from the support posts 36R and 36L and is elastically biased by the coil spring 82 to return in the X1 direction, and the unlock holding mechanism 42 returns to the initial position (see FIG. 4). Therefore, the holding claw 84 fitted to the interlocking displacement member 80 is also displaced in the X1 direction, the engagement between the holding claw 84 and the held piece 72*b* is released, and the slider interlocking mechanism 39 also returns to the initial position (see FIG. 4) due to the elastic force of the coil spring 46. The slider interlocking mechanism 39 and the unlock holding mechanism 42 automatically return to the initial positions and the engaging projection 60 is automatically released from the unlock position and also returns to the initial position, by which a particular preliminary operation is unnecessary when the upper chassis 14 is attached to the lower chassis 18 next time.

Although the unlock operation between the engaging projection 60 and the claw portion 110 by the pressing operation of the release button 204 has been described, the unlock operation with the electric mechanism 202 is performed almost in the same manner. Specifically, as illustrated in FIG. 11, the control unit energizes and contracts the SMA wire 300 by an electric trigger to rotate the electric rotary link 306 and then presses and displaces the step 210*b* by the working piece 306*d* in the X1 direction to rotate the release pushers 38R and 38L, thereby enabling the pusher 228 to protrude upward. At this time, the upper chassis 14 does not automatically come out of the lower chassis 18 and the energized state is maintained. Therefore, it is also possible to provide the control unit for energizing the SMA wire 300 as it is in the upper chassis 14.

Moreover, regarding the electric mechanism 202, the engaging projection 60 and the slider interlocking mechanism 39 are held in the unlock position by the action of the unlock holding mechanism 42 if the release slider 200 is displaced in the X1 direction once, and therefore thereafter the energization may be stopped to cause the electric rotary link 306 and the SMA wire 300 to return to the initial positions (see FIG. 10). In other words, the energizing time during which the SMA wire 300 generates the tensile force need be only a short time (for example, several seconds), thereby preventing the elongation or deterioration of the SMA wire 300.

Furthermore, the operating force by the electric mechanism 202 is irrespective of the weight of the upper chassis 14 and only need be a small force for getting the slider interlocking mechanism 39 and the holding claw 84 to work, in the same manner as in the case of the operation with the release button 204, thereby enabling the flowing current to the SMA wire 300 to be suppressed and prolonging the service life thereof.

Incidentally, the form of the electric trigger for the control unit to drive the electric mechanism 202 is not particularly limited, but, for example, any of an electric switch operation, a screen touch operation, a voice instruction, or a determination with an application by a user may be used.

As described above, in this embodiment, the engaging projection 60 presses the claw portion 110 in the insertion direction to the post hole 52, by which the upper chassis 14 is attached to the lower chassis 18 without a gap, thereby eliminating wobbling. Particularly, the upper chassis 14 is a tablet personal computer and has a weight greater than that of the display unit of a general laptop PC and therefore the upper chassis 14 is required to be stably attached. In this embodiment, the claw portion 110 of the support posts 36R and 36L can be engaged with the engaging projection 60 without wobbling, by which the relatively heavy upper chassis 14 is stably attached.

Moreover, according to the unlock holding mechanism 42 of this embodiment, the engaging projection 60 is held in the unlock position even after the operation in which the release slider 200 releases the engagement between the engaging projection 60 and the claw portion 110. Therefore, it is unnecessary to perform the operation of the release slider 200 and the separation of the upper chassis 14 at the same time, thereby enabling the user to perform a stable operation with one hand when detaching the upper chassis 14 from the lower chassis 18.

Furthermore, in this embodiment, the release slider 200 extending in the length direction of the attachment surface 22*a* has a simple structure so as to easily transmit an action force, by which the vertical width is suppressed. Still further, an operating force can be applied to any part of the long release slider 200, which increases the degree of freedom in arrangement of the release button 204 as a manual operation unit and the electric rotary link 306 of the electric mechanism 202.

Although the upper chassis 14 engages with the lower chassis 18 at two places of the engaging mechanism 32R, 32L and the support post 36R, 36L in this embodiment, one or three or more engagement places are possible according to the lengths of the attachment surface 14*a* and the attachment surface 22*a*.

As has been described, the present invention provides an improved electronic device having a first chassis and a detachable second chassis.

While the invention has been particularly shown and described with reference to a preferred embodiment, it will be understood by those skilled in the art that various changes in form and detail may be made therein without departing from the spirit and scope of the invention.

What is claimed is:

1. An electronic device comprising:

a first chassis having an engagement hole and an engaging projection; and a second chassis detachable from said first chassis, wherein said second chassis includes a hook member protruding from an attachment surface to which said first chassis is attached, wherein said hook member includes a claw portion on a tip side, wherein said claw portion of said hook member engages with said engaging projection of said first chassis with said claw portion being inserted into said engagement hole of said first chassis, and elastically biased so that said claw portion is pressed towards art insertion direction to said engagement hole.

2. The electronic device of claim 1, wherein said first chassis has a slider that includes said engaging projection and is elastically biased in a direction in which said engaging projection engages with said claw portion.

3. The electronic device of claim 2, wherein said engaging projection and said claw portion include inclined surfaces pressed to at least one side of the mutual engagement surfaces due to a wedge action.

4. The electronic device of claim 3, wherein when said first chassis is attached to said second chassis, said engaging projection is pressed to a side surface of said hook member against an elastic force, by which said engaging projection is slid in a non-engagement direction and then is elastically drawn in said engagement direction to abut against and engage with said claw portion.

5. The electronic device of claim 3, wherein said claw portion is made gradually thick from a base end side to said tip side of said hook member to form one of said inclined surfaces.

6. The electronic device of claim 3, wherein said engaging projection is gradually thinned from an entrance side towards a far side of said engagement hole to form one of said inclined surfaces.

7. The electronic device of claim 1, wherein said sliding direction in which said engaging projection is elastically biased is oblique to the extending direction of said claw portion and is a direction of biasing said engaging projection from an entrance side towards a far side of said engagement hole.

8. The electronic device of claim 1, wherein said second chassis includes a release mechanism that moves said engaging projection up to said unlock position in which the engagement with said claw portion is released.

9. The electronic device of claim 8, wherein said first chassis includes an unlock holding mechanism that holds said engaging projection, which has moved by said release mechanism, in an unlock position.

10. The electronic device of claim 8, wherein said unlock holding mechanism holds said engaging projection in said unlock position while said first chassis is located in said attachment position to said second chassis and releases said engaging projection from said unlock position when said first chassis is separated from said second chassis.

11. An electronic device comprising:

a first chassis having an engagement hole, an engaging projection and an unlock holding mechanism; and a second chassis detachable from said first chassis, wherein said second chassis includes a hook member protruding from an attachment surface to which said first chassis is attached and having a claw portion on a tip side, wherein said hook member inserts into said engagement hole, wherein said claw portion of said hook member inserts into said engagement hole and elastically biased so that said claw portion is pressed towards an insertion direction to said engagement hole; and a release mechanism that moves said engaging projection up to an unlock position where the engagement with said claw portion is released; and said unlock holding mechanism holds said engaging projection, which has been moved by said release mechanism, in the unlock position.

12. An electronic device comprising:

a first chassis having an engagement hole, and an engaging projection; and a second chassis detachable from said first chassis, wherein said second chassis includes a hook member protruding from an attachment surface to which said first chassis is attached and having a claw portion on a tip side, wherein said hook member inserts into said engagement hole, and said claw portion of hook member inserts into said engaging engagement hole and elastically biased so that said claw portion is pressed towards said insertion direction to said engagement hole;

a release slider that extends in the length direction of said attachment surface to which said first chassis is attached and is elastically biased to one side and then is moved to the other side against said elastic force so as to release said engagement between said engaging projection and said claw portion;

a manual operation unit that moves the release slider; and an electric mechanism that moves said release slider.

* * * * *